US 6,594,644 B1

(12) United States Patent
Van Dusen

(10) Patent No.: US 6,594,644 B1
(45) Date of Patent: *Jul. 15, 2003

(54) ELECTRONIC GIFT CERTIFICATE SYSTEM

(75) Inventor: Karen L. Van Dusen, Woodinville, WA (US)

(73) Assignee: Amazon.com, Inc., Seattle, WA (US)

( * ) Notice: Subject to any disclaimer, the term of this patent is extended or adjusted under 35 U.S.C. 154(b) by 333 days.

This patent is subject to a terminal disclaimer.

(21) Appl. No.: 09/649,211

(22) Filed: Aug. 28, 2000

Related U.S. Application Data

(63) Continuation of application No. 09/153,632, filed on Sep. 15, 1998.

(51) Int. Cl.$^7$ .............................................. G06F 17/60
(52) U.S. Cl. .............................. 705/39; 705/14; 705/26; 705/77
(58) Field of Search ............................. 705/14, 26, 39, 705/70, 77, 78

(56) References Cited

U.S. PATENT DOCUMENTS

| | | | | |
|---|---|---|---|---|
| 5,467,269 A | * | 11/1995 | Flaten ........................... | 705/14 |
| 5,708,780 A | | 1/1998 | Levergood et al. .......... | 709/229 |
| 5,715,314 A | * | 2/1998 | Payne et al. ................... | 705/78 |
| 5,761,648 A | * | 6/1998 | Golden et al. ................. | 705/14 |
| 5,774,870 A | * | 6/1998 | Storey ........................... | 705/14 |
| 5,790,793 A | | 8/1998 | Higley ........................... | 709/218 |
| 5,793,972 A | | 8/1998 | Shane ............................ | 709/219 |
| 5,812,769 A | | 9/1998 | Graber et al. ................. | 709/228 |
| 5,860,068 A | | 1/1999 | Cook ............................. | 705/26 |
| RE36,116 E | * | 2/1999 | McCarthy ..................... | 705/16 |
| 5,903,878 A | | 5/1999 | Talati et al. ................... | 705/26 |
| 5,946,665 A | | 8/1999 | Suzuki et al. ................. | 705/26 |
| 5,949,044 A | * | 9/1999 | Walker et al. ................ | 235/379 |
| 5,963,915 A | * | 10/1999 | Kirsch .......................... | 705/26 |
| 6,049,785 A | * | 4/2000 | Gifford ........................ | 705/39 |
| 6,098,053 A | * | 8/2000 | Slater ........................... | 705/44 |
| 6,122,625 A | * | 9/2000 | Rosen ........................... | 705/65 |
| 6,138,106 A | | 10/2000 | Walker et al. ................ | 705/14 |
| 6,175,823 B1 | * | 1/2001 | Van Dusen ................... | 705/26 |
| 6,192,407 B1 | | 2/2001 | Smith et al. .................. | 709/229 |
| 6,193,155 B1 | * | 2/2001 | Walker et al. .............. | 235/381 |
| 6,379,251 B1 | * | 4/2002 | Auxier et al. ................. | 463/42 |
| 6,393,411 B1 | * | 5/2002 | Bishop et al. ................. | 705/44 |
| 6,453,300 B2 | * | 9/2002 | Simpson ....................... | 705/26 |
| 6,484,153 B1 | * | 11/2002 | Walker et al. ................ | 705/38 |

FOREIGN PATENT DOCUMENTS

| | | | |
|---|---|---|---|
| JP | 08-263729 A | * | 10/1996 |
| WO | WO 96/31826 | | 10/1996 |

OTHER PUBLICATIONS

Anon., "New Web900 Service Offers Secure Billing over the Internet," News Release, Jul. 1, 1996.*

Crone, R., et al., "Internet Payment Competition Heats up," Financial Services Report, vol. 13, p. 1, Jul. 13, 1996.*

Purpura, L., "Web–Based Couponing, Ads Tested at Randalls," Supermarket News, vol. 47, No. 22, p. 25+, Jun. 2, 1997.*

(List continued on next page.)

*Primary Examiner*—Nicholas David Rosen
(74) *Attorney, Agent, or Firm*—Knobbe, Martens, Olson & Bear LLP

(57) ABSTRACT

An electronic gift certificate system is disclosed which distributes electronic gift certificates in the form of e-mail documents that include hyperlinks for automating the redemption process. When a gift certificate recipient selects such a hyperlink, the recipient's computer automatically transmits a claim code to the merchant's Web site, and the site responds by automatically crediting the recipient's personal account with the gift certificate amount. When the recipient subsequently makes a purchase from the merchant's Web site, the recipient's account balance is automatically applied to the purchase price.

15 Claims, 6 Drawing Sheets

OTHER PUBLICATIONS

Marlatt, A., "Getting Shoppers into the Flooz Habit—Startup Aims to Be Clearinghouse for New Gift Certificates," Internet Worl vol. 5, No. 21, p. 15, Jun. 7, 1999.*

Michelle V. Rafter, "Livewire: Internet makes It Easier to Buy Gifts," Sep. 16, 1999.

"Just in Time for Holidays: Webcertificate," ECommerce Times, Nov. 16, 1998.

"Virtual Vineyards Corporate Gift Program Offers Unique Ways to Reward Client Loyalty and Help Acquire New Customers via the Internet" PR Newswire.

"Corporate Gift Program Uncorked" Direct, vol. 10, p. 73.

Bill Pietrucha, "A Tale of Three Web Sites," The Journal of Business Strategy, p. 28.

Fred Hapgood, "What Makes Virtual Vineyards Rule?," Inc.

David A. Fryxell, "Spotlight: NewsNet" Link–Up, pp. 10–11.

"SilverPlatter to offer NewsNet's Newsflash," Information Today, pp. 1–22.

Alice Klingener, "NewsNet Smart–mail: Push delivery gets smart," Online, pp. 46–47.

* cited by examiner amazon.com

Completing Your Gift Certificate Order is Easy

Please fill in the following information:

1. Please enter your name and the recipient's name:

From: [Erin]

To: [Helaine]

2. Please type the message you would like to appear on the gift certificate: (optional)

Message: [Happy Birthday Mom!!]

3. Gift Certificate amount in U.S. dollars: $ [40]   (minimum $10.00)

4. Gift Certificate amount in U.S. dollars:

◉ E-mail. Please enter the recipient's e-mail address:
   [Helaine@aol.com]

○ Paper mail. We will ask you for the recipient's mailing address later

5. Your Information

Please enter your e-mail address: [Erin@earthlink.net]

○ I am a first-time customer. (You will be asked to create a password later on)

○ I am a returning customer, and my password is [ ]
   Have you forgotten your password?

IMPORTANT: Press this button to [continue] to the next page. You will still have a chance to cancel or change your order.

FIG. 1

ELECTRONIC GIFT CERTIFICATE SYSTEM

This application is a continuation of U.S. application Ser. No. 09/153,632, filed Sep. 15, 1998.

FIELD OF THE INVENTION

The present invention relates to electronic commerce, and more specifically, relates to methods for purchasing, distributing and redeeming electronic gift certificates.

BACKGROUND OF THE INVENTION

In the field of Internet commerce, it is common for Web sites of online merchants to include functionality for allowing users to purchase and redeem electronic gift certificates. To purchase a gift certificate using such a system, the purchaser commonly uses a standard Web browser to retrieve, fill out, and submit a gift certificate order form (typically consisting of one or more form pages). The information requested by the order form typically includes at least the name of the purchaser, the name and e-mail address of the intended recipient, and the monetary amount of the gift certificate.

In response to the submission of the gift certificate order, the Web site automatically generates and sends an e-mail to the recipient. This e-mail commonly includes the name of the purchaser, the amount of the gift certificate, a gift certificate claim code, and instructions for redeeming the gift certificate. To redeem the gift certificate, the recipient is typically required to initially access the merchant's Web site and select one or more items for purchase. The user may additionally or alternatively be required to navigate to a special redemption area. Upon proceeding to a "check-out" area of the site, the user is then provided the opportunity to type in and submit the gift certificate claim code.

This method of distributing and redeeming electronic gift certificates has several problems. One problem is that the recipient is required to manually enter the claim code. In addition to being an inconvenience to the recipient, the user may forget to enter the claim code during the check-out process and thus fail to receive the benefit of the gift certificate. Further, if the recipient makes an error while typing in the claim code, the recipient may be inconvenienced with having to reenter the claim code, or may even be given credit for another user's gift certificate.

Another problem is that the recipient is required to either use the gift certificate immediately or else preserve the claim code for subsequent use. If the claim code is lost prior to use, it may be difficult or impossible for the recipient to redeem the gift certificate.

The present invention seeks to provide a more efficient and reliable system for distributing and redeeming electronic gift certificates.

SUMMARY OF THE INVENTION

The present invention provides an electronic gift certificate system which improves the efficiency and reliability of the redemption process. In accordance with the invention, the system distributes electronic gift certificates in the form of e-mail documents that include hyperlinks for automating the redemption process. When a gift certificate recipient clicks on such a hyperlink, the recipient's computer automatically transmits a claim code or other identification information to the merchant's Web site, and the site responds by automatically crediting the recipient's personal account with the gift certificate amount. When the recipient subsequently makes a purchase from the merchant's Web site, the recipient's account balance is automatically applied to the purchase price.

An important benefit of this process is that it eliminates the need for the recipient to manually enter the claim code. Thus, the redemption process is simpler and more efficient for the gift certificate recipient. In addition, there is little or no risk that the user will submit an erroneous claim code.

Another important benefit is that the recipient need not retain the gift certificate code until the time of purchase. For example, upon receiving the electronic gift certificate, the recipient can immediately click on the link to credit his or her account, but then postpone making a purchase until a later date. The likelihood that the claim code will be lost before the user makes a purchase is thus significantly reduced. In addition, there is no need for the user to remember to enter a claim code or take any other special action during the check-out process.

BRIEF DESCRIPTION OF THE DRAWINGS

These and other features of the invention will now be described with reference to the drawings summarized below. These drawings and the associated description are provided to illustrate a preferred embodiment of the invention, and not to limit the scope of the invention.

FIG. 1 illustrates an example Web site form page for allowing users to order gift certificates.

DETAILED DESCRIPTION OF PREFERRED EMBODIMENTS

Figure 2:
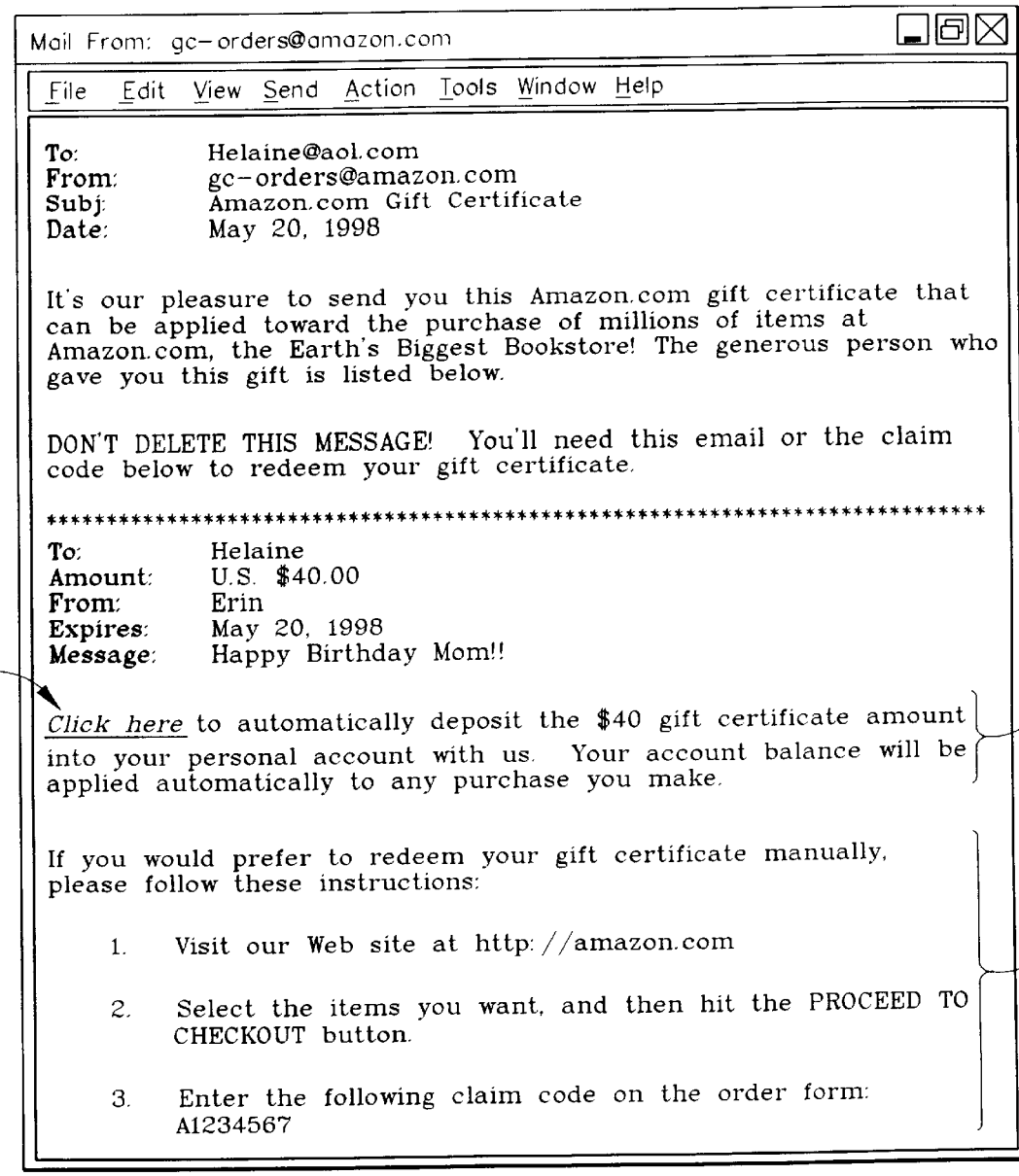
FIG. 2 illustrates an example gift certificate e-mail with a hyperlink for automating the redemption process.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically-distributed computer systems that are appropriately linked together.

The present invention provides an electronic gift certificate system which improves the efficiency and reliability of the redemption process. In accordance with the invention, the system distributes electronic gift certificates in the form of e-mail documents that include hyperlinks for automating the redemption process. When a gift certificate recipient clicks on such a hyperlink, the recipient's computer automatically transmits a claim code to the merchant's Web site, and the site responds by automatically crediting the recipient's personal account with the gift certificate amount. When the recipient subsequently makes a purchase from the merchant's Web site, the recipient's account balance is automatically applied to the purchase price.

An important benefit of this process is that it eliminates the need for the recipient to manually enter the claim code. Thus, the redemption process is simpler and more efficient for the gift certificate recipient. In addition, there is little or no risk that the user will submit an erroneous claim code.

Another important benefit is that the recipient need not retain the gift certificate code until the time of purchase. For example, upon receiving the electronic gift certificate, the recipient can immediately click on the link to credit his or her account, but then postpone making a purchase until a later date. The likelihood that the claim code will be lost prior to use is thus significantly reduced. In addition, there is no need for the user to remember to enter a claim code or take any other special action during the check-out process.

A preferred implementation of the gift certificate system will now be described with reference to FIGS. 1–6. Throughout the following description, reference will be made to various implementation-specific details, including, for example, coding conventions, document and protocol standards, and forms used for purchasing and redeeming electronic gift certificates. These details are provided in order to fully set forth a preferred embodiment of the invention, and not to limit the scope of the invention. The scope of the invention is set forth in the appended claims.

For purposes of illustration, the merchant Web site in the disclosed implementation is the Web site of Amazon.com. As is well known in the field of Internet commerce, the Amazon.com site includes functionality for allowing users to browse and make online purchases from a catalog of over 2.5 million book titles. As described below, the site includes an accounts database which stores information (names, e-mail addresses, billing information, etc.) about users that have previously made purchases from the site. In other embodiments, the items available for purchase from the Web site may, for example, include downloadable items such as software programs and digital publications.

FIG. 1 illustrates an example gift certificate order form page that can be used to place an order for an electronic gift certificate. Users may be provided the option of retrieving this page, for example, by selecting a "gift certificates" link from the Anazon.com site. As depicted by FIG. 1, the form includes fields for specifying the following information: the respective names of the purchaser and the recipient (item 1), an optional message to the recipient (item 2), a gift certificate amount (item 3), the distribution method (item 4), and the e-mail address and account information of the purchaser (item 5).

The order form page may also include fields (not shown) for allowing the purchaser to specifying the recipient using something other than an e-mail address, such as the recipient's name, address and or telephone number. The Web site 50 would then use this information to look up the recipient's e-mail address, such as from an accounts database.

After the purchaser fills out and submits this form page, the purchaser is presented with one or more additional pages (not shown) for completing the order. For example, the user is presented with a page that asks the user to specify a credit card number or other billing information for paying for the gift certificate. Once the order has been placed and paid for, the Web site sends a gift certificate e-mail (FIG. 2) to the recipient and sends an order confirmation e-mail to the purchaser.

FIG. 2 illustrates the general form of the gift certificate e-mail document ("e-mail") that is sent to the recipient. In this example, it is assumed that the recipient is a registered user of the Amazon.com Web site. As depicted by FIG. 2, the e-mail includes a hyperlink 30 for allowing the recipient to automatically redeem the gift certificate, and includes an associated description 32 of the automated redemption process. The hyperlink 30 is displayed to the user as highlighted text, but may alternatively be displayed, for example, as an icon or other graphical image.

The URL (Uniform Resource Locator) associated with the hyperlink 30 preferably includes a gift certificate claim code that uniquely identifies the gift certificate. For example, the URL may be in the form of http://amazon.com/gc/redeem/A1234567, where A1234567 is the claim code. The recipient can select the hyperlink 30 using any technique that is supported by the recipient's computer, including, for example, clicking on the link with a mouse, touching the link on a touch-sensitive display, or using a voice command. When the recipient selects this hyperlink 30, the claim code is conveyed to the Web site (as part of a standard HTTP GET <URL> message) and is used by the site to automatically identify and credit the recipient's personal account. An example redemption confirmation page that is displayed to the recipient upon selecting the hyperlink 30 is shown in FIG. 3 and discussed below.

With further reference to FIG. 2, the e-mail also preferably includes a set of instructions 34 for redeeming the gift certificate using the conventional method. This method involves accessing the Web site, selecting one or more items to be purchased, proceeding to check-out, and then entering the claim code. This redemption method may be useful, for example, if the recipient's e-mail application does not support the use of hyperlinks. In other implementations, the manual redemption instructions 34 may be omitted.

Figure 3:
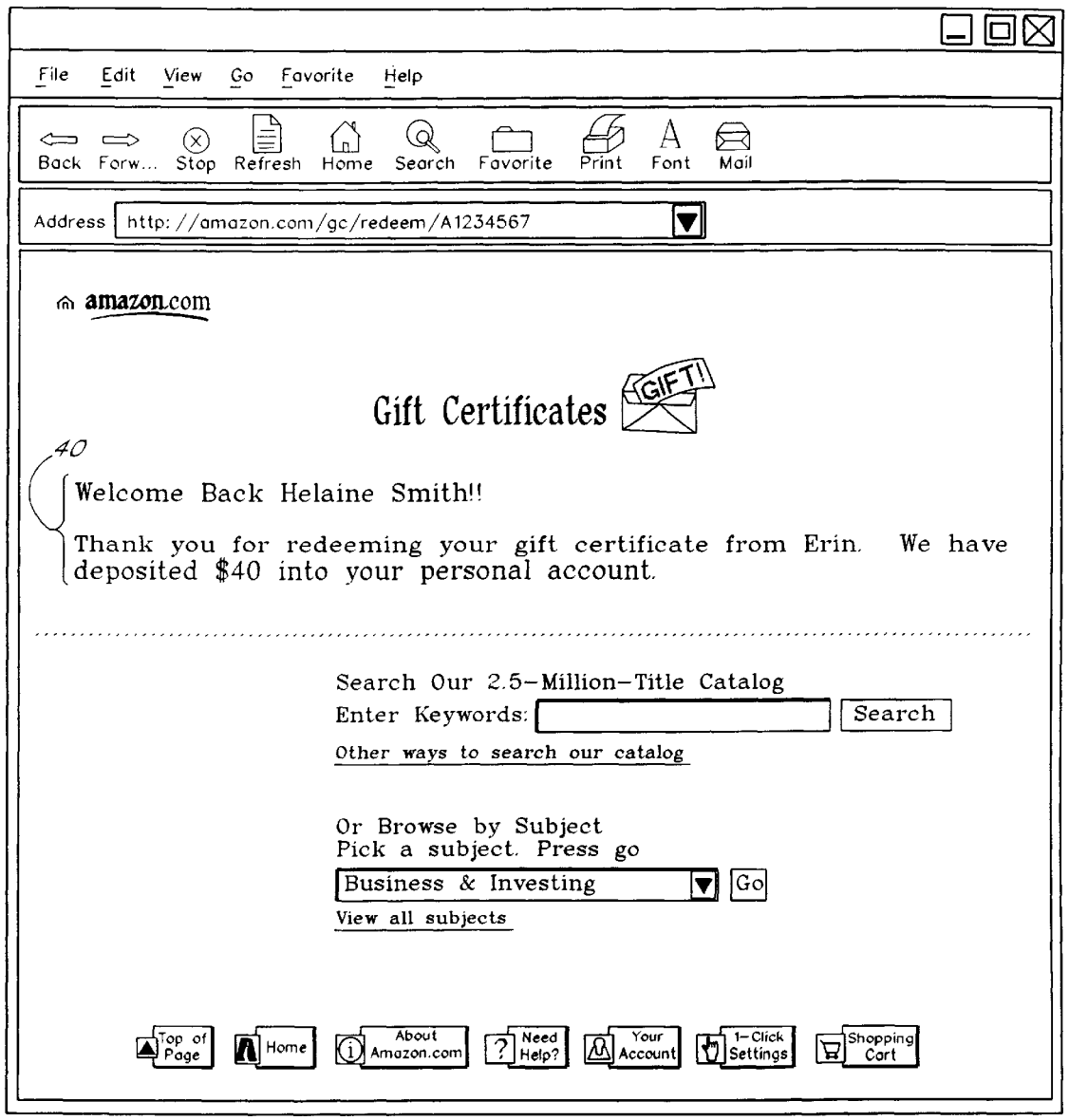
FIG. 3 illustrates an example Web page that is displayed to the gift certificate recipient in response to selection of the hyperlink in FIG. 2.

FIG. 3 illustrates an example Web page that may be displayed to the recipient in response to selection of the hyperlink 30. The Web page includes a message 40 indicating that the gift certificate amount has been successfully deposited into the recipient's account. In other implementations, this page may be preceded, for example, by a page which asks the recipient to confirm that the gift certificate amount should be deposited into the recipient's account.

If the recipient has multiple accounts under the same e-mail address, the recipient may initially be presented with a page which asks the user to select the account to be credited. Alternatively, the gift certificate e-mail (FIG. 2) may be provided with separate hyperlinks 30 for each such account, so that the recipient can both select and credit one of the multiple accounts with a single action (such as a single mouse click). For example, a user that has three accounts under the same e-mail address may receive a gift certificate e-mail that has three hyperlinks (one per account), with each link being presented together with associated account identification information (shipping address, partial credit card number, etc.) that allows the user to identify each account.

From the redemption confirmation page of FIG. 3, the recipient can enter a query for searching the Amazon.com catalog, select a subject to browse, or access other areas of the Anazon.com site. Because the gift certificate amount is maintained in the recipient's account until used, there is no need for the recipient to place an order or even browse the site at this point. In addition, there is no need for the recipient to retain either the gift certificate e-mail or the claim code.

As indicated above, the example set forth in FIGS. 1–3 assumes that the recipient is already registered (i.e., already has an account) with Amazon.com. When the recipient does not have an account, the hyperlink 30 (FIG. 2) and associated description 32 are preferably replaced with a hyperlink (not shown) to an account setup form (not shown). When the user completes and submits the account setup form, the gift certificates application 72 creates the new account and automatically credits the account with the gift certificate amount. Various alternatives to this method are possible. For example, in one embodiment, the purchaser is prompted (via a form page) at the time of purchase for additional information about the unknown user (recipient), and this information is used to set up an account for the recipient.

Figure 4:
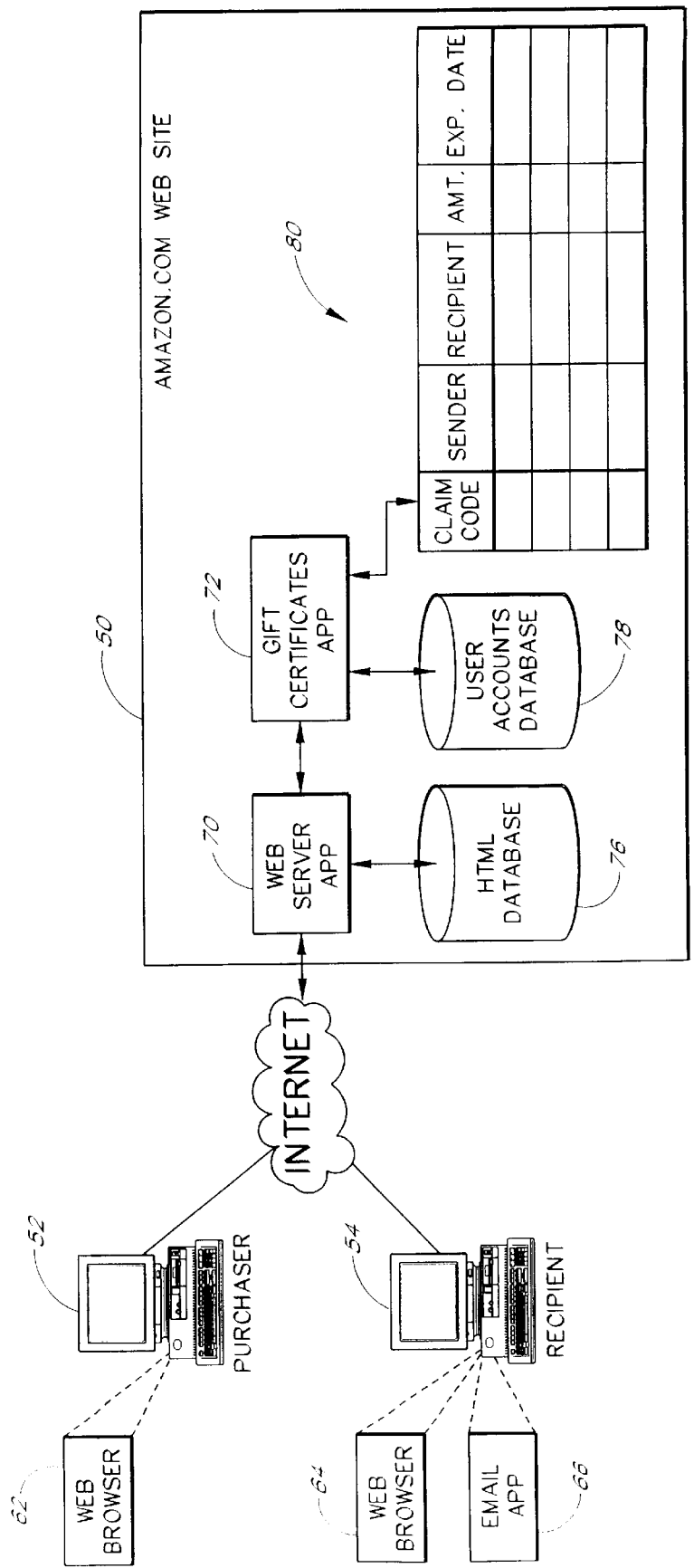
FIG. 4 illustrates a preferred set of Web site components for implementing a gift certificate system in accordance with the invention, and illustrates typical user components for accessing the system.

FIG. 4 illustrates the basic hardware and software components that are typically invoked during the above-described process. As depicted by this drawing, the purchaser and the recipient access the Web site 50 using respective PCs 52, 54 or other general purpose computers that have access to the Internet. The purchaser and/or recipient may alternatively access the Web site 50 using special purpose devices. The purchaser and recipient computers 52, 54 run commercially-available Web browser applications 62, 64 such as Microsoft Internet Explorer™ or Netscape Navigator™, which implement the basic World Wide Web standards such as HTTP and HTML. The recipient's computer 52 also runs a commercially available e-mail application 66, such as Microsoft Outlook™ or Netscape Navigator, which supports the use of hyperlinks. The e-mail application 66 and the browser 64 may be integrated with one another, and/or may be integrated with other application programs or the operating system.

In the embodiment described herein, the Web site 50 comprises a computer system and associated content that are accessible via the Internet. The Web site 50 may optionally include content which spans multiple Internet domains, and/or may be implemented using physical servers that are geographically remote from one another. In other embodiments, the Web site 50 may be in the form of an intranet site, in which case the computers 52, 54 may be coupled to the site solely by a private network. For example, Web site 50 may be in the form of an internal corporate gift store site for company employees.

In other embodiments, the Web site 50 may be replaced with another type of network site. For example, the various gift certificate services described herein could alternatively be implemented on a hypertextual site or browsing area of an online services network such as America Online or MSN, in which case users may access the site using software that implements non-standard document formats and transfer protocols.

As further depicted by FIG. 4, the Web site 50 includes a commercially-available Web server application 70. The Web server application 70 accesses an HTML database 76 that is used to generate Web pages in response to the actions of end users. A products database (not shown) and various back-end components (not shown) are also used for this purpose.

The Web site 50 also includes a gift certificates application 72 (hereinafter "GC application") which includes the basic functionality for processing gift certificate orders and redemption requests. The GC application 72 accesses a user accounts database 78 that includes information about users that have registered (such as by placing an order) with the Web site 50. This information typically includes, for example, the names, e-mail addresses, user IDs, account passwords, shipping addresses, and credit card numbers of such users. The accounts database also stores monetary account balances for users.

As depicted by FIG. 4, the GC application 72 preferably maintains a look-up table 80 of all outstanding gift certificates (i.e., all unexpired gift certificates that have not yet been redeemed). In the embodiment shown, each entry in the table 80 includes the following: the unique claim code, the names and e-mail addresses of the purchaser and recipient, the gift certificate amount, and the expiration date. Some or all of this information may alternatively be stored solely within the user accounts database 78.

Figure 5:
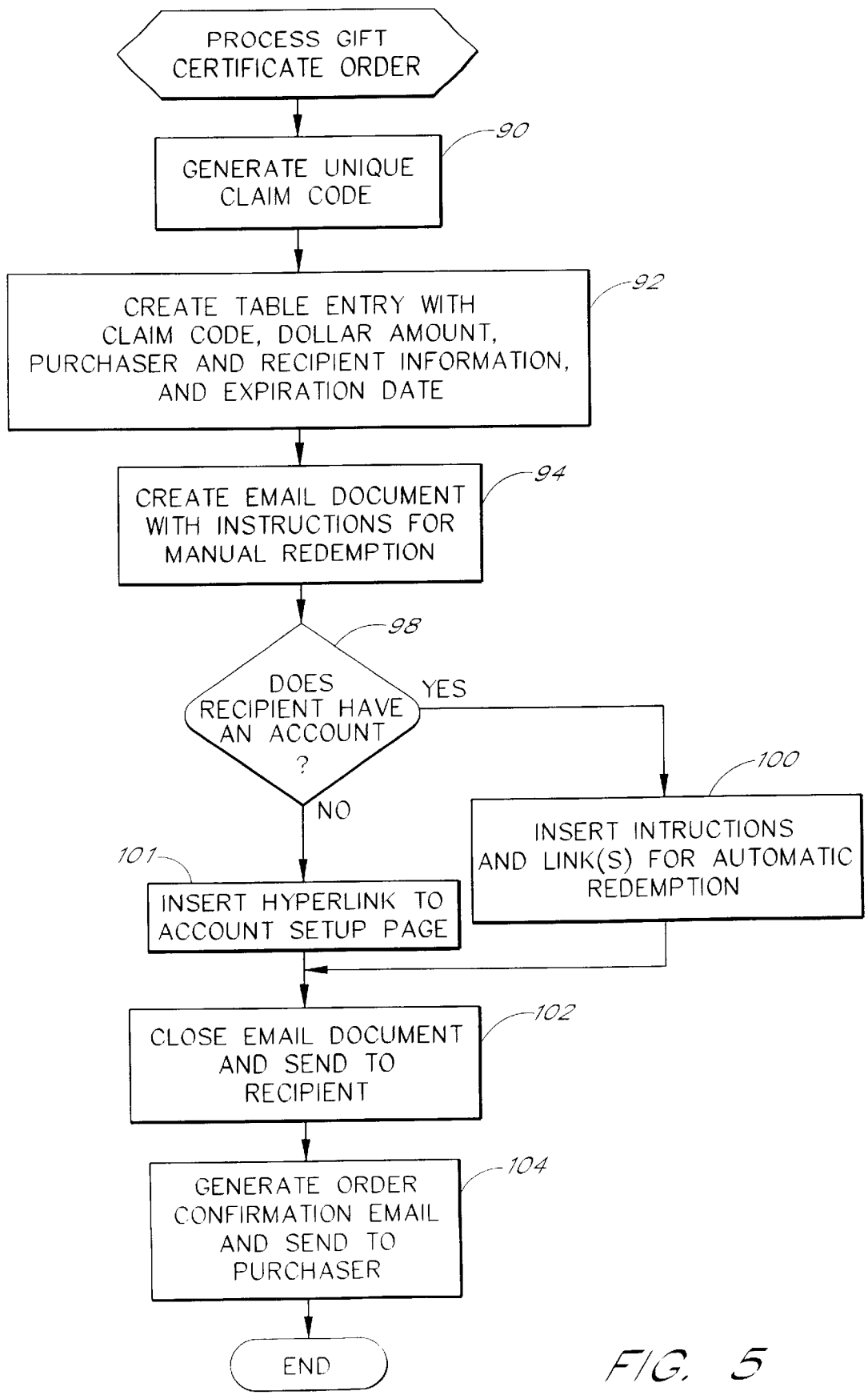
FIG. 5 illustrates a sequence of steps that are performed by the gift certificate application of FIG. 4 in response to submission of a gift certificate order.

FIG. 5 illustrates a sequence of steps that are performed by the GC application 72 to process an order for an e-mail-based gift certificate. This process is executed after the purchaser's credit card number or other payment information has been verified. As depicted by steps 90 and 92, the GC application 72 initially generates a claim code that uniquely identifies the gift certificate, and then stores the claim code and the associated gift certificate information in the table 80. Various alternatives to using a claim code and a look-up table are possible. For example, the claim code could be replaced with an encrypted user ID of the recipient and an encrypted code which represents the gift certificate amount.

The claim codes are preferably selected at random from a relatively large set of possible values (e.g., $10^{12}$ possible values). The outstanding (valid) claim codes thus represent a sparse subset of the universe of possible claim code values. This technique provides a level of security by reducing the likelihood that unauthorized users will be able identify valid claim codes through trial and error. This technique could additionally or alternatively be applied to other portions of the URL. An example of a method that can be used to generate the claim codes to provide a desired level of security is described in a concurrently-filed provisional patent application titled SYSTEM AND METHOD FOR PROVIDING SECURE ACCESS TO PRIVATE WEB PAGES, the disclosure of which is hereby incorporated by reference.

The application 72 also generates an e-mail document to send to the recipient (step 94). The content of the e-mail document is preferably in an HTML format, although other markup languages that support hyperlinks could be used. The e-mail document is initially in the general form shown in FIG. 2, but does not include the hyperlink 30 and associated description 32 for automatically redeeming the gift certificate.

The GC application 72 then accesses the user accounts database 78 (FIG. 4) to determine whether the recipient has an Amazon.com account (step 98). If the recipient has an account, the automatic redemption hyperlink 30 and associated description 32 are generated and inserted within the e-mail document (step 100). The hyperlink 30 includes the appropriate URL for automatically redeeming the gift certificate. The URL may, for example, be in the format http://amazon.com/gc/redeem/<claim code>, and is preferably embedded within the document in the HTML "GET URL" format. In the embodiment described herein, this claim code is the same as the claim code used for manual redemption.

If the recipient does not have an account, a hyperlink to an account setup page is inserted within the e-mail document (step 101) in place of the redemption hyperlink 30. As described above, using this link to set up an account causes the gift certificate to be automatically redeemed.

To accommodate recipients that have multiple accounts under the same e-mail address, the GC application 72 may optionally be configured to generate a separate hyperlink 30 for each such account. As described above, this would allow the recipient to select and credit an account with a single mouse click or other action. To implement this feature, an account identifier may, for example, be appended to each URL. In addition, each hyperlink may be displayed in the e-mail together with a respective account identifier, such as a shipping address, password, or partial credit card number that is unique to that account.

An alternative method for handling a recipient with multiple accounts is to prompt the recipient for the password of the account to be credited. This may be accomplished, for example, by including a password field (not shown) in the gift certificate e-mail. When the user selects the automatic redemption hyperlink 30, the password would be transmitted to the Web site 50 and used to select the account.

With further reference to FIG. 5, the gift certificate e-mail document is then closed and sent to the recipient (step 102). In addition, an order confirmation e-mail is generated and sent to the purchaser (step 104).

Figure 6:
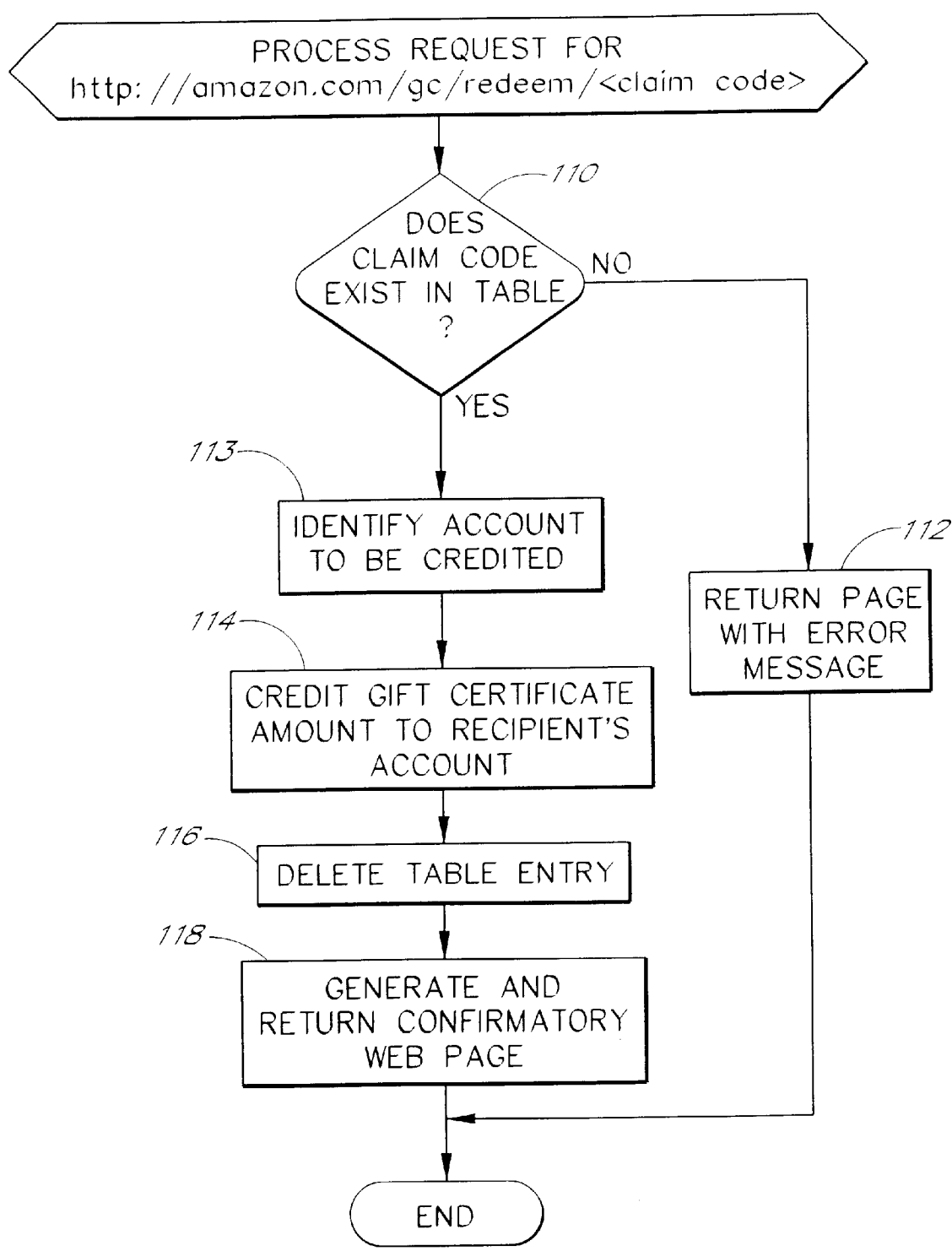
FIG. 6 illustrates an automated redemption process that is implemented by the gift certificate application.

FIG. 6 illustrates a sequence of steps that are performed by the GC application 72 when the Web site 50 receives a request for a URL in the format indicated above. The GC application 72 initially searches the look-up table 80 for an entry having a matching claim code (step 110). If no matching entry is found, a page is generated and returned with an appropriate error message (step 112). The error message may, for example, inform the user that the gift certificate code is invalid and instruct the user to contact customer service if the problem persists.

If the claim code is found in the table 80, the GC application 72 identifies the account to be credited (step 113). If the recipient has only one account, this account is identified from the information in the table 80. If the recipient has multiple accounts, the specific account is identified using information supplied by the recipient. As described above, this additional information may be obtained, for example, by asking the recipient to select a link which corresponds to the account, or by prompting the recipient to type in an account password. Once the account has been identified, the GC application 72 automatically credits the recipient's account with the gift certificate amount (step 114). As indicated above, the recipient may alternatively be prompted to confirm that his or her account should be credited.

Once the recipient's account has been credited, the GC application 72 deletes the corresponding entry from the table 80 (step 116). The GC application 72 may also include a separate process that periodically deletes entries that have expired. The GC application also sends a confirmatory Web page (step. 118; see also FIG. 3) to the recipient's computer 54.

Although this invention has been described in terms of certain preferred embodiments, other embodiments that are apparent to those of ordinary skill in the art are also within the scope of this invention. Accordingly, the scope of the present invention is intended to be defined only by reference to the appended claims.

What is claimed is:

1. A computer-implemented method for conveying and redeeming a monetary certificate, the method comprising:

prompting a user to specify at least a monetary amount of the certificate and a recipient of the certificate;

collecting the monetary amount from the user;

generating a link which includes a URL portion containing a claim code for redeeming the certificate;

transmitting the link by electronic mail to the recipient;

in response to selection of the link, crediting the monetary amount of the certificate to an account of the recipient; and applying a balance in the account to a subsequent purchase made by the recipient.

2. The method as in claim 1, wherein crediting the monetary amount of the certificate to an account of the recipient comprises using the claim code to determine the monetary amount of the certificate.

3. The method as in claim 1, wherein crediting the monetary amount of the certificate to an account of the recipient comprises using the claim code to identify the recipient.

4. The method as in claim 1, wherein the certificate is a gift certificate.

5. The method as in claim 1, wherein the claim code is unique to the recipient.

6. The method as in claim 1, wherein the method comprises crediting the monetary amount to the account of the recipient solely in response to selection of the link, such that no further input by the recipient is required.

7. The method as in claim 1, wherein crediting the monetary amount of the certificate to an account of the recipient comprises prompting the recipient to select an account to be credited.

8. A computer-implemented method for facilitating the redemption of a monetary certificate, the method comprising:

generating a hyperlink which includes a URL portion containing a claim code for redeeming the certificate;

transmitting the hyperlink by electronic mail to a recipient;

using the claim code included in the hyperlink, as passed in response to selection of the hyperlink, to credit a monetary amount of the certificate to an account of the recipient; and applying a balance in the account to a subsequent purchase made by the recipient.

9. The method as in claim 8, wherein crediting a monetary amount of the certificate to an account of the recipient comprises using the claim code to determine the monetary amount of the certificate.

10. The method as in claim 8, wherein crediting a monetary amount of the certificate to an account of the recipient comprises using the claim code to identify the recipient.

11. The method as in claim 8, wherein crediting a monetary amount of the certificate to an account of the recipient comprises using the claim code to look up the monetary amount of the certificate and an identity of the recipient within a table.

12. The method as in claim 8, wherein the certificate is a gift certificate purchased by a user other than the recipient.

13. The method as in claim 8, wherein the claim code is unique to the recipient.

14. The method as in claim 8, wherein the method comprises crediting the monetary amount to the account of the recipient solely in response to selection of the hyperlink, such that no further input by the recipient is required.

15. The method as in claim 8, wherein crediting the monetary amount of the certificate to an account of the recipient comprises prompting the recipient to select an account to be credited.

* * * * *